United States Patent [19]
Hirokane et al.

[11] Patent Number: 5,939,187
[45] Date of Patent: Aug. 17, 1999

[54] MAGNETO-OPTICAL RECORDING MEDIUM

[75] Inventors: Junji Hirokane, Nara; Junichiro Nakayama, Shiki-gun; Akira Takahashi, Nara, all of Japan

[73] Assignee: Sharp Kabushiki Kaisha, Osaka, Japan

[21] Appl. No.: 08/859,614

[22] Filed: May 20, 1997

[30] Foreign Application Priority Data

May 27, 1996 [JP] Japan ................................. 8-131917

[51] Int. Cl.$^6$ .................................................... G11B 5/66
[52] U.S. Cl. ........................ 428/332; 428/336; 428/64.3;
428/694 ML; 428/634 MM; 428/694 EC;
428/694 IS; 428/694 SC; 428/694 RE;
428/694 RL; 428/900; 369/13; 369/272;
369/286; 369/288
[58] Field of Search ............................ 369/13, 272, 286,
369/288; 428/64.3, 332.336, 694 ML, 694 MM,
694 EC, 694 IS, 694 SC, 694 RE, 694 RL

[56] References Cited

U.S. PATENT DOCUMENTS

| | | | |
|---|---|---|---|
| 5,420,833 | 5/1995 | Tanaka | 369/13 |
| 5,563,852 | 10/1996 | Murakami | 369/13 |
| 5,616,428 | 4/1997 | Nishimura | 428/694 ML |
| 5,633,838 | 5/1997 | Hirokane | 369/13 |
| 5,662,988 | 9/1997 | Nakayama | 428/212 |

FOREIGN PATENT DOCUMENTS

| | | |
|---|---|---|
| 586 175 | 3/1994 | European Pat. Off. . |
| 586122A1 | 3/1994 | European Pat. Off. . |
| 586175A1 | 3/1994 | European Pat. Off. . |
| 592 199 | 4/1994 | European Pat. Off. . |
| 596 716 | 5/1994 | European Pat. Off. . |
| 596716A2 | 5/1994 | European Pat. Off. . |
| 196 06 374 | 9/1995 | Germany . |
| 195 36 796 | 4/1996 | Germany . |

OTHER PUBLICATIONS

J. Hirokane et al., "Magnetically Induced Superresolution Using Interferential In–Plane Magnetization Readout Layer", Jpn. J. Appl. Phys. vol 35, Part 1, No. 11, pp. 5701–5704, Nov. 1996.

K. Tamaoni, et al. "Magnetically Induced Superresolution using Magneto–Static Coupling", Magneto–Optical Recording International Symposium 1994, Digests of papers presented at Moris '94, Sep. 27–29, 1994 Tokyo, Japan, 29-K-05, p. 126.

Patent Abstract of Japan vol. 096, No. 00 4, Apr. 30, 1996, Publication No.: 07 320 319; Title: Magneto–Optical Recording Medium.

Tamanoi K et al.; "Magnetically–induced super resolution using magneto–Static coupling" Proceedings of Moris'94: Journal of the Magnetics Society of Japan , vol.17; No. Suppl S1, 2–279 Sep. 1994, Tokyo, JP, pp. 421–424.

Patent Abstract of Japan; vol. 096, No. 008, Aug. 30, 1996; Publication No.: 88 106 662; Title Magneto–Optical Recording Medium.

*Primary Examiner*—Leszek Kiliman
*Attorney, Agent, or Firm*—David G. Conlin; William J. Daley, Jr.

[57] ABSTRACT

A magneto-optical recording medium includes a reproducing layer which has in-plane magnetization at room temperature and has perpendicular magnetization at an elevated temperature of not less than a critical temperature, a recording layer made of a perpendicular magnetization film for recording information, an intermediate layer made of a non-magnetic film formed between the reproducing layer and the recording layer, and an in-plane magnetization layer adjacent to the reproducing layer, in which magnetization is reduced at a temperature in a vicinity of the critical temperature. According to the described magneto-optical recording medium, since information recorded in a recording magnetic domain of a portion having the in-plane magnetization is masked, even in the case where adjacent recording bits fall within a diameter of a spot of a converged light beam, each recording bit can be reproduced separately, thereby obtaining a quality reproduced signal.

22 Claims, 6 Drawing Sheets

MAGNETO-OPTICAL RECORDING MEDIUM

FIELD OF THE INVENTION

The present invention relates to a magneto-optical recording medium for use in a magneto-optical recording and reproducing apparatus, such as a magneto-optical disk, a magneto-optical tape, a magneto-optical card, etc.

BACKGROUND OF THE INVENTION

In recent years, a magneto-optical recording medium has been widely used as a rewritable magneto-optical recording medium. In the magneto-optical recording medium, information is recorded and reproduced by converging a light beam from a semiconductor laser onto the magneto-optical recording medium. However, such magneto-optical recording medium has a drawback in that when a recording bit diameter and an interval between the recording bits are smaller with respect to a diameter of the light beam, reproducing characteristics deteriorate. The described problem occurs for the following reason. As the adjoining recording bits fall within the diameter of spot of the laser beam on the target recording bit, it is not possible to reproduce each recording bit separately.

In order to solve the above-mentioned problem, Japanese Unexamined Patent Publication No. 150418/1994 (Tokukaihei 6-150418) discloses a magneto-optical recording medium including a reproducing layer which has in-plane magnetization at room temperature and in which a transition from the in-plane magnetization to perpendicular magnetization occurs with a temperature rise, a recording layer having perpendicular magnetization for recording information, and a nonmagnetic intermediate layer formed between the reproducing layer and the recording layer wherein the reproducing layer and the recording layer are magnetostatically coupled.

In the described magneto-optical recording medium, information recorded in a recording magnetic domain of a portion in the reproducing layer having the in-plane magnetization is not reproduced, namely, this portion is masked. According to the above arrangement, even in the case where a plurality of recording bits fall within a diameter of a spot of the laser beam converged onto the reproducing layer, an individual recording bit is reproduced separately, provided that the power of the light beam and the temperature at which the reproducing layer has the perpendicular magnetization are appropriately set, thereby achieving a high density recording bits.

However, the magneto-optical recording medium disclosed in the above-mentioned Japanese Unexamined Patent Publication No. 150418/1994 (Tokukaihei 6-150418) have such drawback that in the case where recording and reproducing are carried out on a magneto-optical recording medium having a smaller recording bit diameter and an smaller interval between the recording bits, it is not possible to obtain reproducing signal as a result of insufficient masking of the reproducing layer having the in-plane magnetization.

SUMMARY OF THE INVENTION

It is an object of the present invention to provide a magneto-optical recording medium in which a sufficient reproducing signal can be obtained even when a recording is carried out on a magneto-optical recording medium having a smaller recording bit diameter and a smaller interval between the recording bits.

In order to achieve the above-mentioned object, the magneto-optical recording medium of the present invention is characterized by including a reproducing layer which has in-plane magnetization at room temperature and in which a transition occurs from the in-plane magnetization to perpendicular magnetization at a temperature of not less than a critical temperature, a recording layer for recording information magneto-optically, the recording layer being made of a perpendicular magnetization film, an intermediate layer formed between the reproducing layer and the recording layer, the intermediate layer being made of a non-magnetic film, and an in-plane magnetization layer in which magnetization reduces at a temperature in a vicinity of the critical temperature, the in-plane magnetization is formed adjacent to at least one side of the reproducing layer.

According to the above mentioned arrangement, because the in-plane magnetization layer and the reproducing layer are exchange-coupled at a temperature of not more than the critical temperature, in-plane magnetization masking of the reproducing layer for the recording layer is emphasized. Therefore, even when recording and reproducing are carried out on a magneto-optical recording medium having a smaller recording bit diameter and a smaller interval between the recording bits, a sufficient reproducing signal can be obtained, namely, magnetic superresolution reproducing is achieved. Furthermore, the intermediate layer completely cuts off (1) the exchange coupling between the reproducing layer and the recording layer, and (2) the exchange coupling between the in-plane magnetization layer and the recording layer, thereby achieving a desirable magnetostatic coupling between (1) the reproducing layer and the recording layer, and (2) the in-plane magnetization layer and the recording layer.

For a fuller understanding of the nature and advantages of the invention, reference should be made to the ensuring detailed description taken in conjunction with the accompanying drawings.

DETAILED DESCRIPTION OF THE PREFERRED EMBODIMENTS

The following explains embodiments of the present invention referring to the attached drawings.

Figure 1:
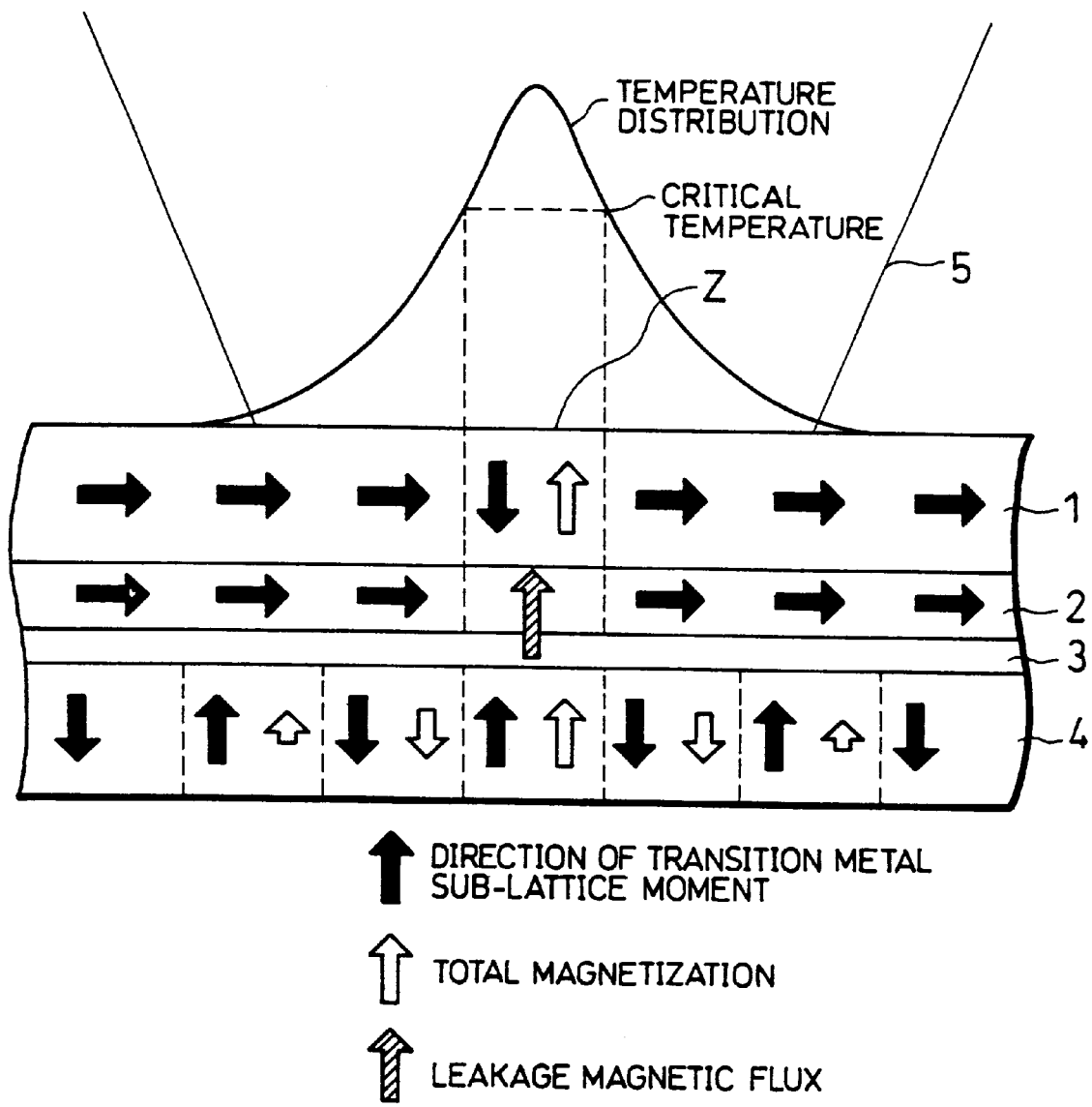
FIG. 1 is an explanatory view explaining a reproducing principle of a magneto-optical recording medium of the present invention.
Figure 2:
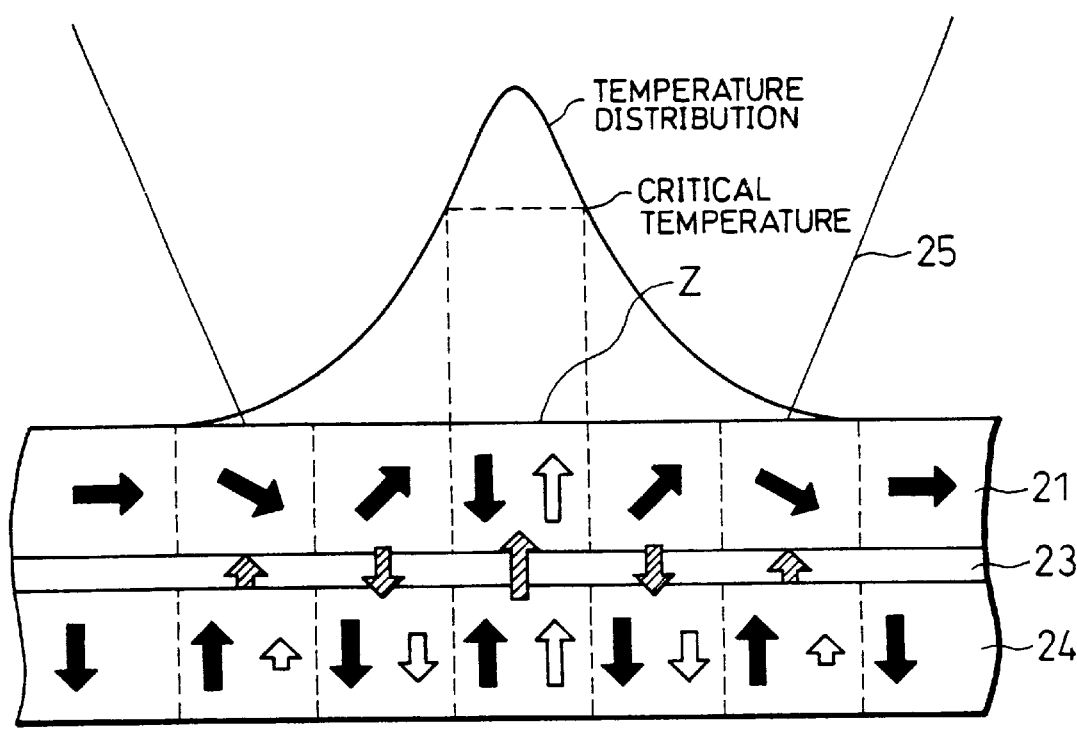
FIG. 2 is an explanatory view explaining a reproducing principle of a conventional magneto-optical recording medium.

First, a principle of a reproducing operation of a magneto-optical recording medium will be explained. FIG. 1 is an explanatory view showing a principle of a superresolution reproducing operation of the magneto-optical recording medium of the present invention. FIG. 2 is an explanatory view showing a principle of a superresolution reproducing operation of a conventional magneto-optical recording medium.

To begin with, an explanation of the principle of the superresolution reproducing operation of the conventional magneto-optical recording medium will be given. As shown in FIG. 2, the conventional superresolution magneto-optical reproducing medium is arranged so as to include a non-magnetic intermediate layer 23 formed between a reproducing layer 21, made of an alloy of a rare earth metal and a transition metal which has in-plane magnetization at room temperature while a transition from the in-plane magnetization to perpendicular magnetization occurs at a temperature of not less than a critical temperature, and a recording layer 24 made of an alloy of a rare earth metal and a transition metal having a compensation temperature at room temperature where the reproducing layer 21 and the recording layer 24 are magnetostatically coupled.

Reproducing is carried out by projecting and converging a light beam 25 from the side of the reproducing layer 21. Upon projecting the light beam 25, a temperature distribution in the form of a Guassian distribution is formed on the medium according to the distribution of light intensity of the light beam 25. In response to the temperature distribution, a transition from the in-plane magnetization to the perpendicular magnetization occurs in the reproducing layer 21. In FIG. 2, a portion Z has a temperature of not less than the critical temperature and therefore has the perpendicular magnetization. Here, the total magnetization in the portion Z of the reproducing layer 21 is arranged in the direction of the leakage magnetic flux generated from the recording layer 24. In this manner, in this magneto-optical recording medium, ideally, only a part in a portion irradiated with the light beam 25 has the perpendicular magnetization and is subjected to reproducing, thereby realizing a superresolution reproducing operation.

As mentioned above, in the magneto-optical recording medium of the present invention, desirably, information is reproduced only from the portion having a temperature of not less than the critical temperature in which the perpendicular magnetization is exhibited. In practice, however, even in a temperature range of not more than the critical temperature, in a vicinity of the portion Z in FIG. 2, the magnetization in the reproducing layer 21 is inclined with respect to the film surface by an effect of the leakage magnetic flux generated from the total magnetization in the recording layer 24. In other words, the region in a vicinity of the portion Z contains perpendicular magnetization components subjected to reproducing. This results from a gradual increase in the leakage magnetic flux generated from the recording layer 24 with a temperature rise, and a transition from the in-plane magnetization to the perpendicular magnetization that occurs gradually in the reproducing layer 21 as temperature rises. Therefore, in the case where reproducing information recorded in the portion Z, information recorded in a region in a vicinity of the portion Z having a temperature of not more than the critical temperature is also reproduced, thereby deteriorating a resolving power in reproducing.

Here, for the reproducing layer 21, in order to achieve such characteristics that the in-plane magnetization is exhibited at room temperature, and a transition occurs therein from the in-plane magnetization to the perpendicular magnetization as temperature rises, with respect to a compensation composition, in which rare earth metal sub-lattice moment and transition metal sub-lattice moment balance with each other, it is required to have a larger amount of the rare earth metal sub-lattice moment so that the direction of the transition metal sub-lattice moment and the direction of the total magnetization in the reproducing layer 21 are anti-parallel to each other. On the other hand, the recording layer 24 including a rare earth-transition metal alloy having a compensation temperature at room temperature, the intensity of the transition metal sub-lattice moment becomes stronger than that of the rare earth metal sub-lattice moment in the process of a temperature rise. As a result, the transition metal sub-lattice moment and the total magnetization in the recording layer 24 are parallel to each other.

Next, as shown in FIG. 1, the principle of the reproducing operation of the superresolution magneto-optical recording medium of the present invention will be explained. In this magneto-optical recording medium, an in-plane magnetization layer 2 is formed adjacent to the reproducing layer 1. The in-plane magnetization layer 2 is designed so as not to have magnetization at a temperature of not less than the critical temperature or so as to have a lower intensity of the magnetization at around the critical temperature as temperature rises.

In the magneto-optical recording medium such as above, since the reproducing layer 1 and the in-plane magnetization layer 2 are adjacent to each other, the in-plane magnetization in the in-plane magnetization layer 2 and the in-plane magnetization in the reproducing layer 1 are exchange-coupled at a temperature of not more than the critical temperature. Therefore, the magnetization direction in the reproducing layer 1 is arranged exactly in an in-plane direction.

Further, upon projecting the light beam 5 onto the magneto-optical recording medium, when the temperature distribution in the form of the Guassian distribution is formed according to the distribution of the light intensity of the light beam 5, the intensity of the magnetization in the in-plane magnetization layer 2 is lowered or the magnetization disappears therefrom with a temperature rise induced by the temperature distribution. On the other hand, a transition from the in-plane magnetization to the perpendicular magnetization occurs in the reproducing layer 21 as temperature rises. Consequently, an exchange coupling force exerted between the in-plane magnetization layer 2 and the reproducing layer 1 weakens. As a result, the reproducing layer 1 has the perpendicular magnetization at a temperature of not less than the critical temperature. Here, the direction of the total magnetization in the portion Z is arranged in the direction of the leakage magnetic flux generated from the recording layer 4.

As described above, in the magneto-optical recording medium of the present invention, since the in-plane magnetization in the in-plane magnetization layer 2 and the in-plane magnetization in the reproducing layer 1 are exchange-coupled at a temperature of not more than the critical temperature, the in-plane magnetization is maintained in the reproducing layer 1. On the other hand, only in a temperature range of not less than the critical temperature, the intensity of the magnetization in the in-plane magnetization layer 2 is lowered, and the exchange coupling force is lowered. As a result, the reproducing layer 1 has the perpendicular magnetization. In this manner, a rapid change in the magnetization directions, i.e., between an in-plane direction and a perpendicular direction of the reproducing layer 1 is realized. Therefore, the object of the present invention that information recorded only in a range having a temperature of not less than the critical temperature in the reproducing layer 1 is reproduced is achieved, and a desirable magnetic superresolution reproducing can be carried out.

[First Embodiment]

Figure 3:
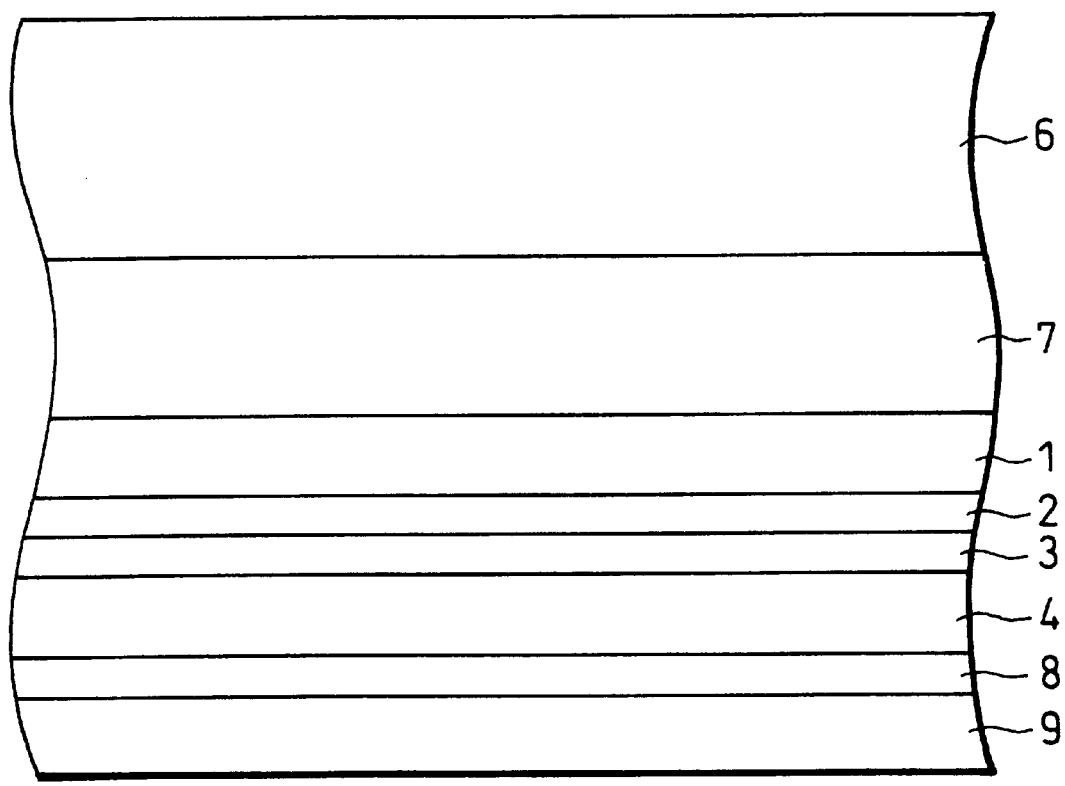
FIG. 3 is an explanatory view showing the schematic structure of a magneto-optical disk of the present invention.
Figure 4:
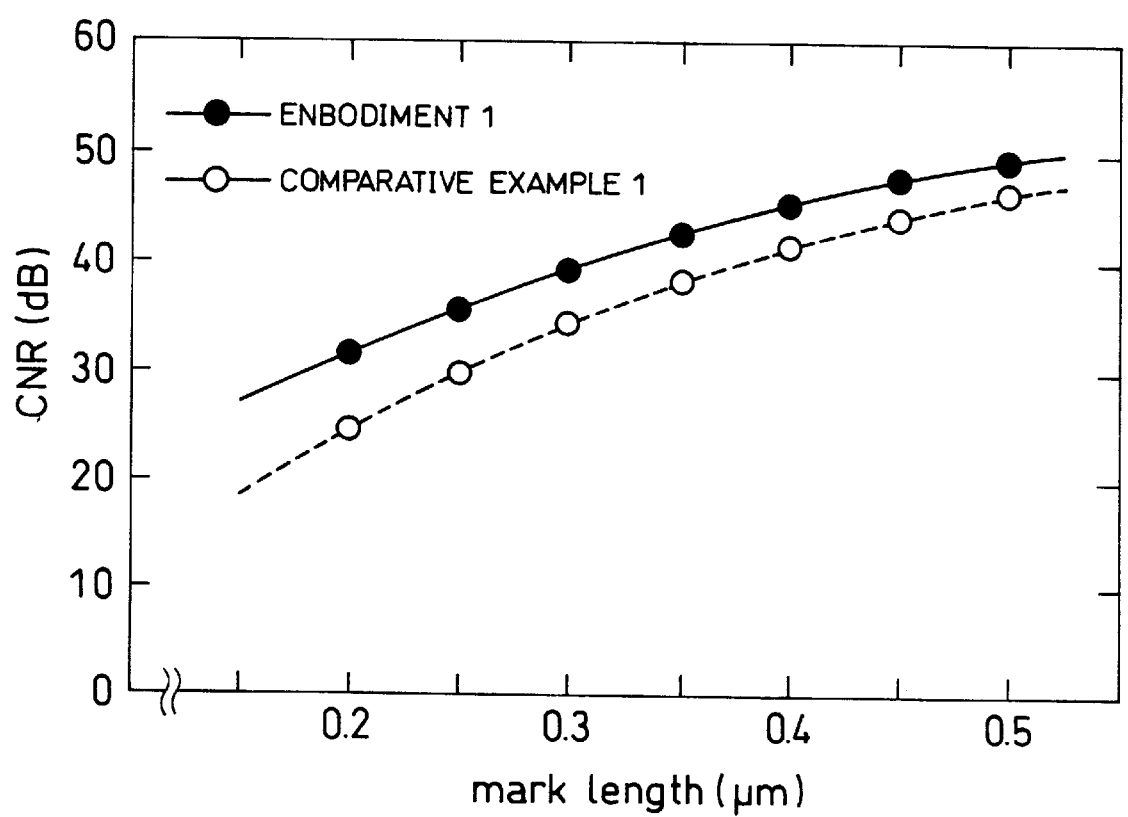
FIG. 4 is a graph showing a mark length dependency of CNR of the magneto-optical disk as defined in FIG. 3.

The following describes one embodiment of the present invention referring to FIG. 3 and FIG. 4. Here, explanations will be given through the case where a magneto-optical disk is adopted as a magneto-optical recording medium.

As shown in FIG. 3, the magneto-optical disk in accordance with the present embodiment is composed of a disk main body including a substrate 6, a transparent dielectric layer 7, a reproducing layer 1, an in-plane magnetization layer 2, a non-magnetic intermediate layer 3, a recording layer 4, a protective layer 8, and an overcoat layer 9 which are laminated in this order.

The described magneto-optical disk adopts a recording system based on a Curie temperature. Namely, a light beam 5 projected from a semiconductor laser is converged onto a reproducing layer 1 by an objective lens, and information recording and reproducing operations are performed by utilizing the magneto-optical effect known as the polar Kerr effect, i.e., a polarization plane of reflected light rotates in a reverse direction according to the magnetization direction in the magnetic layer having a magnetization in a direction perpendicular to the light incident surface.

The substrate 6 formed in a disk shape is made of a transparent material such as polycarbonate.

It is preferable that the transparent dielectric layer 7 is made of materials which do not include oxygen, such as AlN, SiN, AlSiN, etc., and has a film thickness to realize a desired interference effect and increase an angle of the Kerr rotation of the medium. Specifically, when the wavelength of the reproducing laser beam is $\lambda$, and the index of refraction is n, the thickness of the film is set approximately to ($\lambda$/4n). For example, in the case where the wavelength of the laser beam is 680 nm, the film thickness of the transparent dielectric layer 7 is set approximately in a range of 40 nm and 100 nm.

The reproducing layer 1 is a magnetic film made of a rare earth-transition metal alloy, and its composition is adjusted so as to have such magnetic characteristics that the reproducing layer 1 has in-plane magnetization at room temperature while a transition from the in-plane magnetization to the perpendicular magnetization occurs with a temperature rise.

The in-plane magnetization layer 2 is made of a magnetic film including the following alloy or metals as a main component: rare earth-transition metal alloy, a rare earth metal, or a transition metal, and the in-plane magnetization layer 2 has magnetization in a direction parallel to the film surface. As mentioned above, the composition of the in-plane magnetization layer 2 is adjusted so that the in-plane magnetization is maintained in the reproducing layer 1 at a temperature of not more than the critical temperature so that the intensity of the magnetization at a temperature above the critical temperature is lowered to allow leakage magnetic flux, generated from the recording layer 4 in response to the weakening of the magnetization at a temperature of not less than the critical temperature, to transmit.

The non-magnetic intermediate layer 3 is made of dielectrics such as AlN, SiN, and AlSiN, etc., or an alloy composed of a non-magnetic metal such as Al, Ti, and Ta, etc. The non-magnetic intermediate layer 3 has a film thickness in a range of 1 nm and 40 nm in order to magnetostatically couple (1) the reproducing layer 1 and the recording layer, and (2) the in-plane magnetization layer 2 and the recording layer 4.

The recording layer 4 is a perpendicular magnetic film made of the rare earth-transition metal alloy, and the film is set to a thickness in a range of 20 nm and 80 nm.

The protective layer 8, which is made of dielectrics such as AlN, SiN, and AlSiN, etc., or an alloy composed of a non-magnetic metal such as Al, Ti, and Ta, etc., is formed in order to prevent the oxidation of the rare earth-transition metal used in the reproducing layer 1 or the recording layer 4. The film is set to a thickness in a range of 5 nm and 60 nm in order to realize a desirable protective thin film for preventing oxygen from passing through.

The overcoat layer 9 is formed on the protective layer 8 by applying an ultraviolet ray hardening resin or a thermal hardening resin by spin-coating. Then, an irradiation of the ultraviolet ray or an application of heat is carried out.

Next, the method of manufacturing the magneto-optical disk of the present embodiment and specific examples of recording and reproducing characteristics having the above-mentioned arrangement will be explained.

(1) The Method of Manufacturing the Magneto-Optical Disk

The following describes the method of manufacturing the magneto-optical disk having the above-mentioned arrangement.

First, the substrate 6 formed in a disk shape made of polycarbonate having formed thereon pregroove and prepit is placed on a substrate holder inside the sputtering device provided with a target of Al, a GdFeCo alloy, a GdFeAl alloy, and a GdDyFeCo alloy and air is exhausted from the sputtering device to $1 \times 10^{-6}$ Torr, and a mixed gas of argon and nitrogen is introduced therein, and an electric power is supplied to the Al target, and under the gas pressure of $4 \times 10^{-3}$ Torr, the transparent dielectric film 7 made of AlN having a film thickness of 80 nm is formed on the substrate 6.

Next, again, air is exhausted from the sputtering device to $1 \times 10^{-6}$ Torr, and argon gas is introduced therein. Then, an electric power is supplied to the GdFeCo alloy target, and under the gas pressure of $4 \times 10^{-3}$ Torr, the reproducing layer 1 made of $Gd_{0.30}(Fe_{0.80}Co_{0.20})_{0.70}$ having a film thickness of 40 nm is formed on the transparent dielectric layer 7. The reproducing layer 1 has such characteristics that the in-plane magnetization is exhibited at room temperature, and a transition occurs therein from the in-plane magnetization to the perpendicular magnetization at 120° C. with the compensation temperature and the Curie temperature of 300° C. and 320° C. respectively.

Then, an electric power is supplied to the GdFeAl alloy target, and under the gas pressure of $4 \times 10^{-3}$ Torr, the in-plane magnetization layer 2 made of $(Gd_{0.11}Fe_{0.89})_{0.75}Al_{0.25}$ having a film thickness of 20 nm is formed on the reproducing layer 1. The in-plane magnetization layer 2 is an in-plane magnetization layer with a Curie temperature of 120° C. having magnetization in a direction parallel to the film surface at temperatures ranging from room temperature to the Curie temperature (120° C.).

In the next stage, the non-magnetic intermediate layer 3 made of AlN having a film thickness of 4 nm is formed on the in-plane magnetization layer 2 by introducing a mixed gas of argon and nitrogen under the gas pressure of $4 \times 10^{-3}$ Torr.

After air was exhausted from the sputtering device to $1 \times 10^{-6}$ Torr, and argon gas was introduced therein, and electric power was supplied to the GdDyFeCo alloy target, and under the gas pressure of $4 \times 10^{-3}$ Torr, the recording layer 4 made of $(Gd_{0.50}Dy_{0.50})_{0.23}(Fe_{0.80}Co_{0.20})_{0.77}$ having a film thickness of 40 nm is formed on the non-magnetic intermediate layer 3. The compensation temperature and a Curie temperature of the recording layer 4 are 25° C. and 275° C. respectively.

Next, a mixed gas of argon and nitrogen is introduced, and an electric power is supplied to the Al target, then under the gas pressure of $4\times10^{-3}$ Torr, the protective layer 8 made of AlN having a film thickness of 20 nm is formed on the recording layer 4.

Finally, the overcoat layer 9 is formed on the protective layer 8 by applying an ultraviolet ray hardening resin by spin-coating. Then, an irradiation of the ultraviolet ray is carried out.

(2) Recording and Reproducing Characteristics

The CNR (carrier to noise ratio) of the abovementioned magneto-optical disk is measured by the optical pickup using a semiconductive laser having a wavelength of 680 nm. FIG. 4 shows a mark length dependency of the CNR (carrier to noise ratio).

For comparison, the mark length dependency of the CNR (carrier to noise ratio) of a magneto-optical disk without the in-plane magnetization layer 2 is also shown in the FIG. 4 as a comparative example 1. Here, the arrangement of the magneto-optical disk without the in-plane magnetization layer 2 has the same arrangement of the magneto-optical disk of the present embodiment from which the in-plane magnetization layer 2 is excluded. The mark length dependency of the CNR indicates the carrier to noise ratio at the time of sequentially forming a recording magnetic domain having a length corresponding to the mark length by a recording magnetic domain pitch having twice the length of the mark length.

When comparing the embodiment 1 and the comparative example 1 at the mark length of 0.3 μm, it is observed that the CNR in the comparative example 1 and the embodiment 1 are 34.0 dB and 39.5 dB respectively, thereby showing an increment of 5.5 dB in the CNR. This results from the in-plane magnetization layer 2 which increases a resolving power in reproducing by improving the in-plane magnetization masking.

As described above, the magneto-optical disk of the present embodiment includes the in-plane magnetization layer 2 formed adjacent to the reproducing layer 1, and the magnetization in the in-plane magnetization layer 2 decreases around the critical temperature of the reproducing layer 1. Therefore, such problem that the magnetization direction in the reproducing layer 1 is inclined with respect to the film surface at a temperature of not more than the critical temperature is prevented, thereby improving the resolving power in reproducing.

Next, the following is results of measurements for determining recording and reproducing characteristics of the magneto-optical disk of the present embodiment by varying the following: ① a film thickness of the reproducing layer 1 and the in-plane magnetization layer 2, ② a film thickness of the nonmagnetic intermediate layer 3, ③ materials and compositions of the in-plane magnetization layer 2.

① Film Thickness of the Reproducing Layer 1 and the In-Plane Magnetization Layer 2

Table 1 shows the result of a measurement of the CNR at the mark length of 0.3 μm in which the film thickness of the reproducing layer 1 and the in-plane magnetization layer 2 are varied.

TABLE 1

| Thickness of Reproducing Layer (nm) | Thickness of in-plane Magnetization Layer (nm) | CNR (dB) |
|---|---|---|
| 40 | 0* | 34.0 |
| 40 | 2 | 35.0 |

TABLE 1-continued

| Thickness of Reproducing Layer (nm) | Thickness of in-plane Magnetization Layer (nm) | CNR (dB) |
|---|---|---|
| 40 | 5 | 37.5 |
| 40 | 10 | 38.5 |
| 40 | 20 | 39.5 |
| 40 | 40 | 35.5 |
| 40 | 60 | 33.5 |
| 8 | 20 | 32.5 |
| 10 | 20 | 34.5 |
| 20 | 20 | 36.5 |
| 30 | 20 | 38.5 |
| 40 | 20 | 39.5 |
| 60 | 20 | 36.5 |
| 80 | 20 | 34.5 |
| 120 | 20 | 33.5 |

*The second row indicates the result where a magneto-optical recording medium without the in-plane magnetization layer is used. (comparative example 1)

In Table 1, the film thickness of 0 nm under the column of the thickness of in-plane magnetization layer indicates the result of the conventional magneto-optical recording medium (hereinafter referred to as comparative example 1) without the in-plane magnetization layer.

As can be seen from Table 1, even in the case where the film thickness of the in-plane magnetization layer 2 is very thin, i.e., 2 nm, the CNR has an increment of 1 dB compared with the result of the comparative example 1. This results from strengthening of the in-plane magnetization masking at a temperature of not more than the critical temperature of the reproducing layer 1. Further, as the film thickness of the in-plane magnetization layer 2 is increased, the CNR also increases until the film thickness reaches 20 nm, and the CNR decreases for the film thicknesses thicker than 20 nm, and becomes smaller than that of the comparative example 1 when the film thickness is 60 nm. This is thought to be resulting from the in-plane magnetization masking that has become too strong so as to affect a portion where perpendicular magnetization should occur such that the perpendicular magnetization becomes incomplete. Therefore, it can be seen from Table 1 that a film thickness of the in-plane magnetization layer 2 is preferably in a range of 2 nm and 40 nm.

Table 1 also shows that in the case where the film thickness of the reproducing layer 1 is 8 nm, the CNR becomes lower than that of the comparative example 1 as the reproducing signal diminishes. Further, in the case where the film thickness of the reproducing layer 1 is 120 nm, the CNR becomes lower than that of the comparative example 1 for a reason that a complete perpendicular magnetization in a portion where the temperature has risen not less than the critical temperature is prevented as a result of an increase in an energy of a magnetic wall generated in the reproducing layer 1. Therefore, as it can be seen in Table 1, a film thickness of the reproducing layer 1 in a range of 10 nm and 80 nm is preferred in order to obtain CNR higher than that of the comparative example 1.

② Film Thickness of the Non-Magnetic Intermediate Layer 3

Table 2 shows results of measurements of the CNR and the intensity of magnetic field required for erasing (erasing magnetic field) at the mark length of 0.3 μm as the film thickness of the non-magnetic intermediate layer 3 is varied.

TABLE 2

| Thickness of Non-Magnetic Intermediate Layer (nm) | CNR (dB) | Erasing Magnetic Field (kA/m) |
|---|---|---|
| 0.5 | 25.0 | 35.5 |
| 1 | 42.5 | 32.4 |
| 4 | 41.0 | 28.8 |
| 10 | 40.0 | 25.4 |
| 20 | 39.5 | 24.6 |
| 30 | 38.5 | 21.4 |
| 40 | 38.0 | 19.3 |
| 60 | 36.5 | 17.2 |
| 80 | 35.5 | 14.6 |
| 100 | 29.5 | 12.4 |

As can be seen from Table 2, the CNR becomes considerably low when the film thickness of the non-magnetic intermediate layer 3 is 0.5 nm. It is assumed that this problem is caused by undesirable coupling due to the non-magnetic intermediate layer 3 being too thin. Table 2 also shows that CNR is maximized when the film thickness of the non-magnetic intermediate layer 3 is 1 nm, and the CNR decreases with an increase in the film thickness of the non-magnetic intermediate layer 3 as the magnetostatic coupling force becomes weaker. Therefore, it is required to set the film thickness of the non-magnetic intermediate layer 3 in a range of 1 nm and 80 nm in order to obtain a higher CNR than that of the comparative example 1.

Further, the magnetostatic coupling force is decreased by thickening the film of the non-magnetic intermediate layer 3. This lowers the intensity of the erasing magnetic field. Therefore, it is preferable that the non-magnetic intermediate layer 3 has a film thickness of not less than 4 nm in order to make the erasing magnetic field to have a value of not more than 31 kA/m that has a practical use.

③ Materials and Compositions of the In-plane Magnetization Layer 2.

The explanations on the recording and reproducing characteristics have been given through the case where the in-plane magnetization layer 2 made of $(Gd_{0.11} Fe_{0.89})_{0.75} Al_{0.25}$ having a Curie temperature of 120° C. is used. Here, results of measurements for determining the recording and reproducing characteristics with a varying ratio of Al content in the in-plane magnetization layer 2 will be described.

Table 3 shows a Curie temperature $T_{c2}$ and the CNR at the mark length of 0.3 μm measured by an optical pickup using a semiconductive laser having a wavelength of 680 nm by changing the value of X (atom ratio) in the in-plane magnetization layer 2 made of $(Gd_{0.11} Fe_{0.89})_x Al_{1-x}$ having a film thickness of 20 nm.

TABLE 3

| X (atom ratio) | $T_{c2}$ (° C.) | CNR (dB) |
|---|---|---|
| 0.25 | 35 | 34.0 |
| 0.30 | 60 | 35.5 |
| 0.50 | 95 | 37.0 |
| 0.75 | 120 | 39.5 |
| 1.00 | 220 | 37.5 |

Table 3 shows that CNR that are higher than the CNR (34.0 dB) of the comparative example 1 in which the in-plane magnetization layer 2 is not formed is obtained when X falls in a range of $0.30 \leq X \leq 1.00$.

Here, the reproducing layer 1 has the perpendicular magnetization at 120° C. Therefore, since the in-plane magnetization layer 2 is required to emphasize the in-plane magnetization masking only at a temperature of not more than 120° C., the optimum value of the Curie temperature of the in-plane magnetization layer 2 is set to 120° C.

However, as shown in Table 3, CNR that is higher than the CNR obtained in the comparative example 1 is also obtained at the Curie temperature of the in-plane magnetization layer in a range of not less than 60° C. and not more than 220° C. Therefore, the in-plane magnetization masking of the reproducing layer 1 can be emphasized to some degree by using a material which lowers its magnetization as temperature rises to around the critical temperature, instead of using a material in which magnetization becomes zero at the critical temperature at which the reproducing layer 1 has the perpendicular magnetization.

Here, although the results are based on the case where GdFeAl is used as an in-plane magnetization layer 2, other materials also can be used, provided that the material has a Curie temperature in a range of 60° C. and 220° C. For example, an in-plane magnetization layer 2 made of GdFe, NdFe, NdFeAl, DyFe, and DyFeAl can be used. One example of such case is described below where $(Gd_{0.11} Fe_{0.89})_{0.75} Z_{0.25}$ (Z is a metal element other than Al) is used as the in-plane magnetization layer 2.

Table 4 shows a Curie temperature $T_{c2}$ of the above-mentioned in-plane magnetization layer 2 and the CNR at the mark length of 0.3 μm measured by an optical pickup using a semiconductive laser having a wavelength of 680 nm. Here, Ti, Ta, Pt, Au, Cu, $Al_{0.5} Ti_{0.5}$, and $Al_{0.5} Ta_{0.5}$ may be used for Z, and for comparison, the CNR of the magneto-optical disk without the in-plane magnetization layer is shown in the afore-mentioned comparative example 1 (Table 1).

TABLE 4

| Z | $T_{c2}$ (° C.) | CNR (dB) |
|---|---|---|
| Ti | 115 | 40.0 |
| Ta | 110 | 39.0 |
| Pt | 125 | 39.5 |
| Au | 120 | 39.5 |
| Cu | 110 | 38.5 |
| $Al_{0.5} Ti_{0.5}$ | 125 | 39.5 |
| $Al_{0.5} Ta_{0.5}$ | 125 | 39.0 |

As it can be seen from Table 4, CNR that are higher than that of the comparative example 1 are obtained in all cases where Ti, Ta, Pt, Au, Cu, $Al_{0.5} Ti_{0.5}$, and $Al_{0.5} Ta_{0.5}$ are used for Z. As described, the recording and reproducing characteristics improve when a Curie temperature falls in a range of 60° C. and 220° C. Hence, for the in-plane magnetization layer 2, an in-plane magnetization layer made of GdFeTi, GdFeTa, NdFeTi, NdFeTa, DyFeTi, and DyFeTa may be adopted.

In addition, examples of rare earth metals that can be used as materials for the in-plane magnetization layer 2 include Tb and Dy, etc.

In the above-mentioned ① to ③, explanations on the recording and reproducing characteristics have been given through the case where the reproducing layer 1 is made of $Gd_{0.30}(Fe_{0.80}Co_{0.20})_{0.70}$ having a film thickness of 40 nm, the in-plane magnetization layer 2 is made of $(Gd_{0.11}Fe_{0.89})_{0.75} Al_{0.25}$ having a film thickness of 20 nm, the non-magnetic intermediate layer 3 is made of AlN having a film thickness of 4 nm, and the recording layer 4 is made of $(Gd_{0.50}Dy_{0.50})_{0.23} (Fe_{0.80}Co_{0.20})_{0.77}$ having a film thickness of 40 nm with varying the values of ① a film thickness of the reproducing layer 1 and the in-plane magnetization layer 2, ② a film thickness of the non-magnetic intermediate layer 3, and ③ materials and compositions of the in-plane magnetization layer 2. Despite this, even in the case where a reproducing layer 1, an in-plane magnetization layer 2, a non-magnetic intermediate layer 3, and a recording layer 4 having materials and compositions which are different from the above references are used, the same results are obtained. Therefore, it is preferred that the reproducing layer 1, the in-plane magnetization layer 2, the non-magnetic intermediate layer 3, and the recording layer 4 respectively have a film thickness in a range of not less than 10 nm and not more than 80 nm, not less than 2 nm and not more than 40 nm, and not less than 1 nm and not more than 80 nm.

[Second Embodiment]

Figure 5:
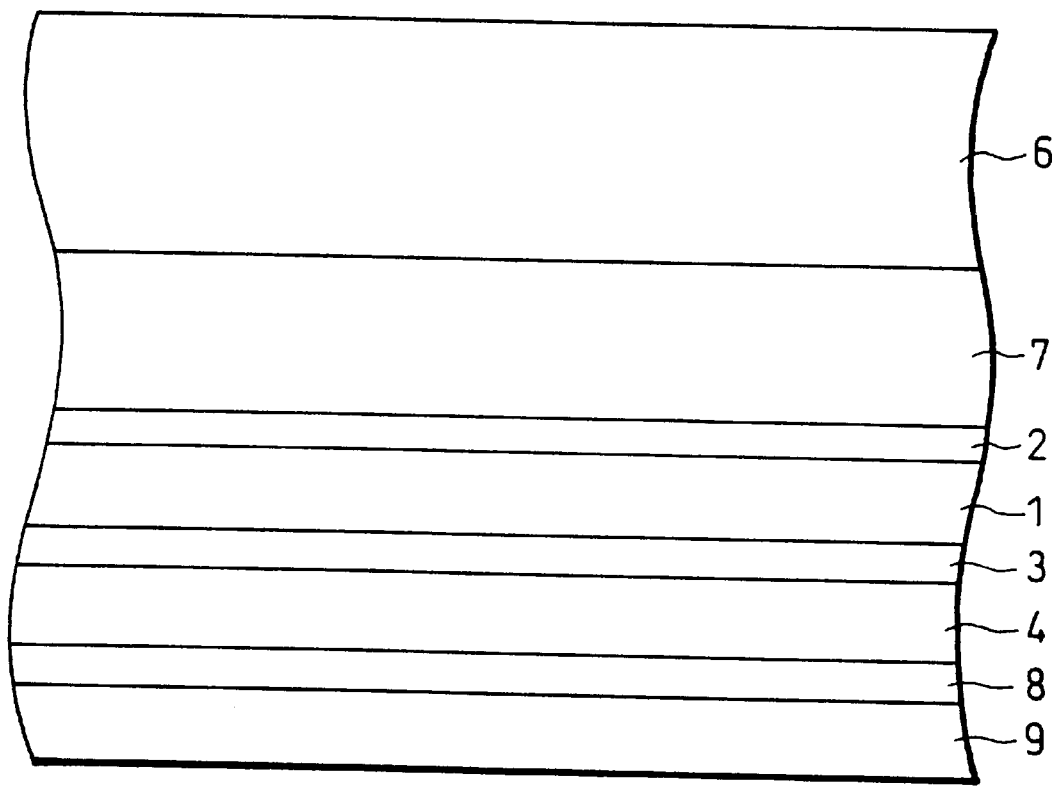
FIG. 5 is an explanatory view showing the schematic structure of another magneto-optical disk of the present invention.

The following describes another embodiment of the present invention referring to FIG. 5. Here, for convenience, members having the same functions as the members indicated in the figures of the abovementioned embodiment are given the same reference numerals, and the explanations thereof are omitted. In the present embodiment, explanations are given through the case where a magneto-optical disk is adopted as a magneto-optical recording medium.

As shown in FIG. 5, the magneto-optical disk in accordance with the present embodiment is composed of a disk main body including a substrate 6, a transparent dielectric layer 7, an in-plane magnetization layer 2, a reproducing layer 1, a nonmagnetic intermediate layer 3, a recording layer 4, a protective layer 8, and an overcoat layer 9 which are laminated in this order. In short, the magneto-optical disk of the present embodiment has an arrangement where the order of forming the reproducing layer 1 and the in-plane magnetization layer 2 is reversed from that of the magneto-optical disk of the first embodiment.

Next, the method of manufacturing the magneto-optical disk of the present embodiment and recording and reproducing characteristics thereof will be explained.

(1) The Method of Manufacturing the Magneto-Optical Disk

The magneto-optical disk of the present embodiment can be manufactured by reversing the order of forming the reproducing layer 1 and the in-plane magnetization layer 2 in accordance with the method of manufacturing the magneto-optical disk as defined in the first embodiment. In this manner, a magneto-optical disk composed of the substrate 6, the transparent dielectric layer 7, the in-plane magnetization layer 2, the reproducing layer 1, the non-magnetic intermediate layer 3, the recording layer 4, the protective layer 8, and the overcoat layer 9 is manufactured.

(2) Recording and Reproducing Characteristics

Table 5 shows CNR at the mark length of 0.3 μm measured by the optical pickup using a semiconductive laser having a wavelength of 680 nm as a film thickness of the reproducing layer 1 and a film thickness of the in-plane magnetization layer 2 are varied.

TABLE 5

| Thickness of Reproducing Layer (nm) | Thickness of in-plane Magnetization Layer (nm) | CNR (dB) |
|---|---|---|
| 40 | 0* | 34.0 |
| 40 | 2 | 34.5 |
| 40 | 4 | 35.0 |
| 40 | 6 | 37.0 |
| 40 | 8 | 37.0 |
| 40 | 10 | 34.5 |
| 40 | 12 | 32.5 |
| 10 | 6 | 31.0 |
| 15 | 6 | 34.5 |

TABLE 5-continued

| Thickness of Reproducing Layer (nm) | Thickness of in-plane Magnetization Layer (nm) | CNR (dB) |
|---|---|---|
| 20 | 6 | 35.5 |
| 30 | 6 | 37.5 |
| 40 | 6 | 37.0 |
| 50 | 6 | 36.5 |
| 60 | 6 | 35.5 |
| 70 | 6 | 33.5 |

*The second row indicates the result where a magneto-optical recording medium without the in-plane magnetization layer is used. (comparative example 1)

In Table 5, the film thickness of 0 nm under the column of the thickness of in-plane magnetization layer indicates the result of the conventional magneto-optical recording medium (comparative example 1) without the in-plane magnetization layer.

It can be seen in Table 5 that even in the case where the film thickness of the in-plane magnetization layer 2 is very thin, i.e., 2 nm, the CNR has an increment of 0.5 dB compared with the result of the comparative example 1. This results from reinforcement of the in-plane magnetization masking at a temperature of not more than the critical temperature of the reproducing layer 1. Further, if a film thickness of the in-plane magnetization layer 2 is made thicker than 10 nm, the CNR become lower than that of the comparative example 1. This results from a decrease in an intensity of a reproducing signal caused by the laser beam 5 which passes through the in-plane magnetization layer 2 which does not contain reproducing information. Therefore, a film thickness of the in-plane magnetization layer 2 for obtaining CNR higher than that of the comparative example 1 is in a range of 2 nm and 10 nm.

Furthermore, compared with the magneto-optical disk of the first embodiment, the CNR is relatively low since the in-plane magnetization layer 2 is positioned at the light incident side of the light beam 5. Consequently, a range of a film thickness of the reproducing layer 1 for achieving CNR which are higher than that of the comparative example 1 is reduced. Consequently, it is required to set a film thickness of the reproducing layer 1 to have a film thickness in a range of 15 nm and 60 nm.

Here, explanations on the recording and reproducing characteristics have been given through the case where the reproducing layer 1 is made of $Gd_{0.30}(Fe_{0.80}Co_{0.20})_{0.70}$, the in-plane magnetization layer 2 is made of $(Gd_{0.11}Fe_{0.89})_{0.75}Al_{0.25}$, the non-magnetic intermediate layer 3 is made of AlN, and the recording layer 4 is made of $(Gd_{0.50}Dy_{0.50})_{0.23}(Fe_{0.80}Co_{0.20})_{0.77}$ with varying film thicknesses of the reproducing layer 1 and the in-plane magnetization layer 2. Even in the case where a reproducing layer 1, an in-plane magnetization layer 2, a non-magnetic intermediate layer 3, and a recording layer 4 having materials and compositions which are different from the above references are used, the same results are obtained. Therefore, it is preferred that the reproducing layer 1 and the in-plane magnetization layer 2 respectively have a film thickness in a range of not less than 15 nm and not more than 60 nm, and not less than 2 nm and not more than 10 nm.

In addition, it is preferred that the nonmagnetic intermediate layer 3 has the same condition as that in the first embodiment, namely, a film thickness in a range of not less than 1 nm and not more than 80 nm is preferred.

[Third Embodiment]

Figure 6:
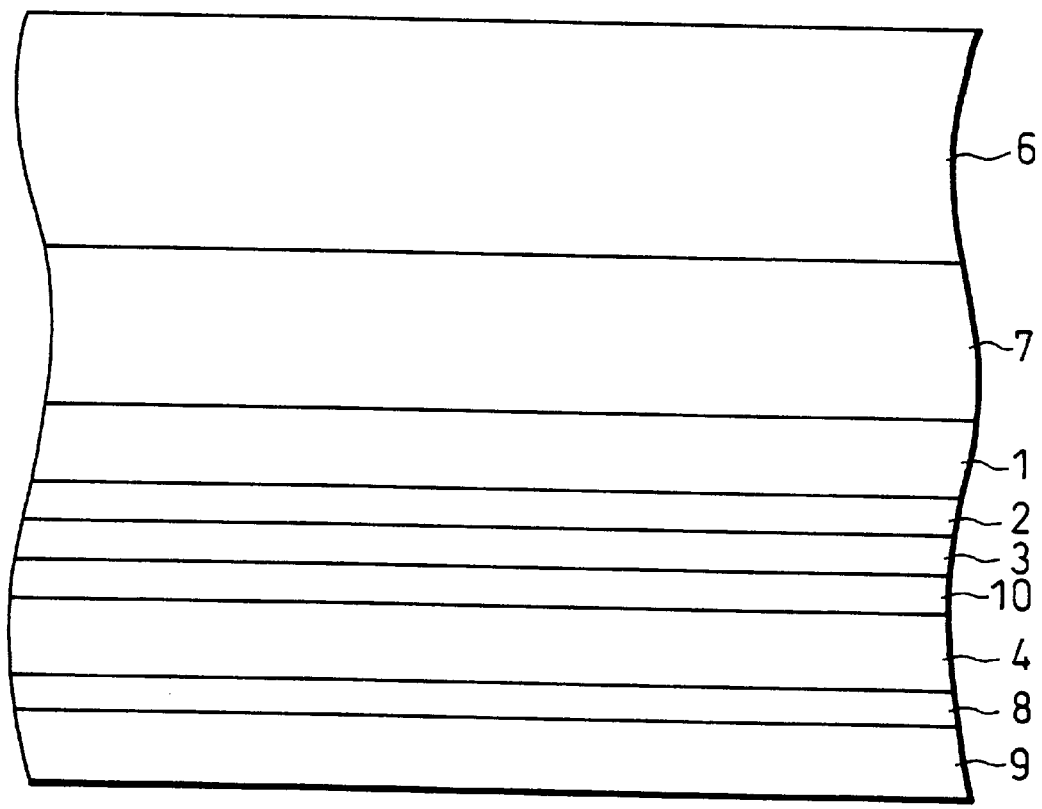
FIG. 6 is an explanatory view showing the schematic structure of still another magneto-optical disk of the present invention.

The following describes still another embodiment of the present invention referring to FIG. 6. Here, for convenience, members having the same functions as the members indicated in the Figures of the abovementioned embodiment are given the same reference numerals, and the explanations thereof are omitted. In the present embodiment, explanations will be given through the case where a magneto-optical disk is adopted as a magneto-optical recording medium.

As shown in FIG. 6, the magneto-optical disk in accordance with the present embodiment is composed of a disk main body including a substrate 6, a transparent dielectric layer 7, a reproducing layer 1, an in-plane magnetization layer 2, a non-magnetic intermediate layer 3, a reflecting layer 10, a recording layer 4, a protective layer 8, and an overcoat layer 9 which are laminated in this order.

In the magneto-optical disks adopted in the first and second embodiments, in the case where a total film thickness of the reproducing layer 1 and the in-plane magnetization layer 2 is less than 40 nm, it is possible that information recorded on the recording layer 4 is mingled in the reproducing layer 1 as the light beam 5 having passed through the reproducing layer 1 and the in-plane magnetization layer 2 is reflected by the recording layer 4. In case of such event, the mask effect due to the in-plane magnetization in the reproducing layer 1 and the in-plane magnetization in the in-plane magnetization layer 2 is decreased.

In order to solve the above-mentioned problem, the magneto-optical disk of the present embodiment having the arrangement of the magneto-optical disk of the first embodiment further includes the reflective layer 10 formed between the non-magnetic intermediate layer 3 and the recording layer 4. According to the above arrangement, even in the case where the total film thickness of the reproducing layer 1 and the in-plane magnetization layer 2 becomes not more than 40 nm, the light beam 5 having passed through the reproducing layer 1 and the in-plane magnetization layer 2 is reflected by the reflective layer 10, thereby preventing the information recorded on the recording layer 4 from entering the reproducing signal, and achieving a mask effect of the in-plane magnetization in the reproducing layer 1 and the in-plane magnetization in the in-plane magnetization layer 2.

The following will explain the method of manufacturing the magneto-optical disk of the present embodiment and recording and reproducing characteristics thereof.

(1) The Method of Manufacturing the Magneto-Optical Disk

The method of manufacturing the magneto-optical disk of the present embodiment differs from the manufacturing method of the first embodiment in that the reflective layer 10 made of Al is formed between the non-magnetic intermediate layer 3 and the recording layer 4. Namely, the substrate 6, the transparent dielectric layer 7, the reproducing layer 1, the in-plane magnetization layer 2, the nonmagnetic intermediate layer 3, the recording layer 4, the protective layer 8, and the overcoat layer 9 are formed in the same manner as that of the first embodiment where the film thickness of the reproducing layer 1 and the in-plane magnetization layer 2 is set to 17.5 nm and 7.5 nm respectively.

Here, after forming the non-magnetic intermediate layer 3, air is exhausted again from the sputtering device to $1\times10^{-6}$ Torr, and argon gas is introduced therein, and an electric power is supplied to the Al target. Then, under the gas pressure of $4\times10^{-3}$ Torr, the reflective layer 10 having a film thickness of 2 nm to 80 nm is formed on the non-magnetic intermediate layer 3.

(2) Recording and Reproducing Characteristics

Table 6 shows CNR at the mark length of 0.3 μm measured by an optical pickup using a semiconductive laser having a wavelength of 680 nm as a film thickness of the reflective layer 10 is varied.

TABLE 6

| Thickness of Reflective Layer (nm) | CNR (dB) |
|---|---|
| 0* | 35.5 |
| 2 | 36.0 |
| 5 | 37.5 |
| 10 | 38.0 |
| 20 | 40.5 |
| 30 | 39.0 |
| 40 | 37.0 |
| 50 | 33.5 |

*The second row indicates the result where a magneto-optical recording medium without the reflective layer is used. (comparative example 2)

In Table 6, the film thickness of 0 nm under the column of the thickness of the reflective layer indicates a result of the measurement where the conventional magneto-optical recording medium (comparative example 2) without the reflective layer 10 is used.

It can be seen from Table 6 that even in the case where film thickness of the reflective layer 10 is very thin, i.e., 2 nm, the CNR has an increment of 0.5 dB compared with the result of the comparative example 2 as information from the recording layer 4 is cut off so that it is not reproduced. Further, if a film thickness of the reflective layer 10 is gradually made thicker, the CNR also becomes higher and is maximized when the film thickness is 20 nm. This is a result of the same effect mentioned above in which the information from the recording layer 4 is cut off so that it is not reproduced except that the effect is more apparent here with an increase in the film thickness of the reflective layer 10. According to Table 6, the CNR decreases when the film thickness is not less than 20 nm. This results from weakening of the magnetostatic coupling force exerted between the recording layer 4 and the reproducing layer 1 as the distance between the recording layer 4 and the reproducing layer 1 increases. Therefore, a film thickness of the reflective layer 10 needs to be set to a range of 2 nm to 40 nm in order to obtain a higher CNR than that of the comparative example 2.

Next, recording and reproducing characteristics based on the case where other materials are used for the reflective layer will be described.

Explanation have been given on the recording and reproducing characteristics through the case where Al is used for the reflective layer 10. In the following, results obtained when adopting the reflective layer 10 made of a metal alloy of Al and metals other than Al will be described.

Table 7 shows CNR at the mark length of 0.3 μm measured by the optical pickup using a semiconductive laser having a wavelength of 680 nm and the intensity of the erasing magnetic field as values of X (atom ratio) are varied in the reflective layer 10 made of $Al_{1-x}Fe_x$ having a film thickness of 20 nm.

TABLE 7

| X (atom ratio) | CNR (dB) | Erasing Magnetic Field (kA/m) |
|---|---|---|
| 0 | 40.5 | 50 |
| 0.02 | 40.5 | 17 |
| 0.05 | 40.5 | 16 |
| 0.10 | 40.5 | 17 |
| 0.25 | 40.0 | 18 |
| 0.50 | 39.5 | 30 |
| 0.60 | 38.5 | 58 |

As can be seen in Table 7, as the Fe content increases, in other words, as the X becomes larger than 0.10, the CNR gradually decreases. Despite this, all the CNR are higher than that of the comparative example 2, thereby showing the effect of forming the reflective layer 10. On the other hand, as for the erasing magnetic field, the erasing magnetic field of high intensity, i.e., 50 kA/m is required in the case of adopting the reflective layer 10 made of pure Al is used, whereas the erasing magnetic field can be decreased by setting the X to a value in a range of not less than 0.02 and not more than 0.50.

Next, Table 8 shows CNR at the mark length of 0.3 µm measured by an optical pickup using a semiconductive laser having a wavelength of 680 nm and an intensity of the erasing magnetic field as values of X (atom ratio) are varied in the reflective layer 10 made of $Al_{1-x}Ni_x$ having a film thickness of 20 nm.

TABLE 8

| X (atom ratio) | CNR (dB) | Erasing Magnetic Field (kA/m) |
|---|---|---|
| 0 | 40.5 | 50 |
| 0.02 | 40.5 | 15 |
| 0.05 | 40.0 | 16 |
| 0.10 | 40.0 | 18 |
| 0.25 | 39.5 | 18 |
| 0.50 | 39.0 | 28 |
| 0.60 | 38.0 | 62 |

As is clear from Table 8, as in the case where Fe is included, the erasing magnetic field can be reduced by setting the X to a value in a range of not less than 0.02 and not more than 0.50.

The erasing magnetic field also can be reduced in the same manner by adding magnetic metals such as Co, Gd, Tb, Dy, and Nd, etc., to Al instead of Fe and Ni.

Next, Recording and reproducing characteristics in the case where non-magnetic metal elements are added to Al as the reflective layer 10 will be described.

Table 9 shows CNR at the mark length of 0.3 µm measured by the optical pickup using a semiconductive laser having a wavelength of 680 nm and an intensity of the erasing magnetic field as values of X (atom ratio) are varied with respect to the reflective layer 10 made of $Al_{1-x}Ti_x$ having a film thickness of 20 nm.

TABLE 9

| X (atom ratio) | CNR (dB) | Erasing Magnetic Field (kA/m) |
|---|---|---|
| 0 | 40.5 | 50 |
| 0.02 | 40.5 | 15 |
| 0.05 | 40.0 | 16 |

TABLE 9-continued

| X (atom ratio) | CNR (dB) | Erasing Magnetic Field (kA/m) |
|---|---|---|
| 0.10 | 40.0 | 18 |
| 0.25 | 40.5 | 17 |
| 0.50 | 40.0 | 15 |
| 0.75 | 39.5 | 17 |
| 0.90 | 40.0 | 16 |
| 0.95 | 39.5 | 17 |
| 0.98 | 39.0 | 15 |
| 1.00 | 38.0 | 48 |

As is clear from Table 9, as the Ti content increases, in other words, as the X becomes larger than 0.10, the CNR gradually decreases. Despite this, all the CNR are higher than that of the comparative example 2, thereby showing the effect of forming the reflective layer 10. On the other hand, as for the erasing magnetic field, the erasing magnetic field of high intensity, i.e., 50 kA/m is required in the case where the reflective layer 10 made of pure Al is used, whereas the erasing magnetic field can be made smaller by setting the value for X in a range of not less than 0.02 and not more than 0.98.

Next, Table 10 shows erasing magnetic field reducing effects in the case where non-magnetic metal elements other than Ti are added to Al as the reflective layer 10, and CNR at the mark length of 0.3 µm measured by the optical pickup using a semiconductive laser having a wavelength of 680 nm and an intensity of the erasing magnetic field in the case where non-magnetic metals excluding Ti are used as Z with respect to the reflective layer 10 made of $Al_{0.5}Z_{0.5}$.

TABLE 10

| Z | CNR (dB) | Erasing Magnetic Field (kA/m) |
|---|---|---|
| Ta | 39.0 | 15 |
| Pt | 41.0 | 16 |
| Au | 41.5 | 15 |
| Cu | 40.5 | 17 |
| Si | 40.0 | 16 |

As is clear from Table 10, CNR higher than that of the comparative example 2 are obtained in all cases where Ta, Pt, Au, Cu, and Si are used for Z, thereby showing the effect of forming the reflective layer 10. As for the erasing magnetic layer, the erasing magnetic field can be reduced as in the case where Ti is added to Al.

As described above, the erasing magnetic field is reduced by adding a magnetic metal and a non-magnetic metal to Al. This is because by adding magnetic metals and non-magnetic metals, crystallization of Al at the time of forming the reflective layer 10 can be prevented, thereby improving a magnetic characteristics of the recording layer 4 formed thereon.

In addition, examples of a material for the reflective layer that can be used alone such as Al or as an alloy in combination with other element include Ti, Ta, Pt, Au, Cu, Si, etc.

As described above, the first magneto-optical recording medium of the present invention is characterized by including a reproducing layer which has in-plane magnetization at room temperature and in which a transition occurs from the in-plane magnetization to perpendicular magnetization at a temperature of not less than a critical temperature, a recording layer for recording information magneto-optically, the recording layer being made of a perpendicular magnetization film, an intermediate layer formed between the reproducing layer and the recording layer, the intermediate layer being made of a non-magnetic film, and an in-plane magnetization layer in which magnetization reduces at a temperature in a vicinity of the critical temperature, the in-plane magnetization is formed adjacent to at least one side of the reproducing layer.

In accordance with the above arrangement, since the in-plane magnetization layer and the reproducing layer are magnetostatically coupled at a temperature of not more than the critical temperature, the magnetization direction in the reproducing layer does not incline with respect to the film surface, and an in-plane magnetization masking of the reproducing layer for the recording layer is emphasized. Therefore, even in the case where recording and reproducing are carried out on a magneto-optical recording medium having a smaller recording bit diameter and a smaller interval between the recording bits, a sufficient recording signal can be obtained, namely, magnetic superresolution reproducing is achieved. Furthermore, the non-magnetic intermediate layer completely cuts off (1) the exchange coupling exerted between the reproducing layer and the reproducing layer, and (2) the exchange coupling exerted between the in-plane magnetization layer and the recording layer, thereby achieving a desirable magnetostatic coupling between (1) the reproducing layer and the recording layer, and (2) the in-plane magnetization layer and the recording layer.

The second magneto-optical recording medium of the present invention having the same arrangement as the above-mentioned first magneto-optical recording medium of the present invention is characterized in that the magnetization in the in-plane magnetization layer disappears at a temperature around the critical temperature.

According to this arrangement, since the magnetization in the in-plane magnetization layer disappears at a temperature around the critical temperature, the magnetization direction in the reproducing layer is not regulated by the in-plane magnetization layer, thereby permitting transferring of the leakage magnetic flux from the recording layer to the reproducing layer with ease.

The third magneto-optical recording medium of the present invention having the arrangement of the first magneto-optical recording medium of the present invention is characterized in that the in-plane magnetization layer eliminates exchange coupling with the reproducing layer to allow the leakage magnetic flux to be transferred from the recording layer to the reproducing layer.

According to this arrangement, since the in-plane magnetization layer and the reproducing layer are magnetostatically coupled at a temperature of not more than the critical temperature, an in-plane magnetization masking of the reproducing layer is emphasized. On the other hand, at a temperature of not less than the critical temperature, the leakage magnetic flux is transferred from the recording layer to the reproducing layer. Therefore, even when recording and reproducing are carried out on a magneto-optical recording medium having a smaller recording bit diameter and a smaller interval between the recording bits, a sufficient recording signal can be obtained, namely, magnetic super-resolution reproducing is achieved.

The fourth magneto-optical recording medium of the present invention having the same arrangement as the above-mentioned first magneto-optical recording medium of the present invention is characterized in that the Curie temperature of the in-plane magnetization layer is substantially the same as the critical temperature.

According to this arrangement, when the temperature of the in-plane magnetization layer becomes substantially the same as the critical temperature, the magnetization in the in-plane magnetization layer disappears. Therefore, at a temperature of not more than the critical temperature, the reproducing layer and the in-plane magnetization layer are magnetostatically coupled, and the magnetization direction in the reproducing layer is regulated by the in-plane magnetization layer. On the other hand, at a temperature of not less than the critical temperature, the magnetization direction in the reproducing layer is not regulated by the in-plane magnetization layer since the magnetization in the in-plane magnetization layer disappears, and the reproducing layer has the perpendicular magnetization as a result. Therefore, at a temperature of not more than the critical temperature, the magnetization direction in the reproducing layer does not incline with respect to the film surface, and the in-plane magnetization masking is emphasized. Moreover, at a temperature of not less than the critical temperature, the leakage magnetic flux from the recording layer is transferred to the reproducing layer with ease.

The fifth magneto-optical recording medium of the present invention having the same arrangement as the above-mentioned first magneto-optical recording medium of the present invention is characterized in that the in-plane magnetization layer is composed an alloy selected from the group consisting of: a GdFe alloy, a GdFeAl alloy, a GdFeTi alloy, a GdFeTa alloy, a GdFePt alloy, a GdFeAu alloy, a GdFeCu alloy, a GdFeAlTi alloy, and a GdFeAlTa alloy.

According to this arrangement, a desirable exchange coupling is made between the in-plane magnetization layer and the reproducing layer, and the in-plane magnetization masking in the reproducing layer is emphasized, thereby achieving a desirable magnetic superresolution reproducing.

The sixth magneto-optical recording medium of the present invention having the arrangement of the first magneto-optical recording medium of the present invention is characterized in that the reproducing layer, the in-plane magnetization layer, the intermediate layer, and the recording layer are formed in this order, and the film thickness of the in-plane magnetization layer is in a range of not less than 2 nm and not more than 40 nm.

According to the arrangement, the exchange coupling force exerted between the in-plane magnetization layer and the reproducing layer is set so as to have a desirable condition, and the in-plane magnetization masking in the reproducing layer is desirably emphasized.

The seventh magneto-optical recording medium of the present invention having the same arrangement as the above-mentioned first magneto-optical recording medium of the present invention is characterized in that the reproducing layer, the in-plane magnetization layer, the intermediate layer, and the recording layer are formed in this order, and the film thickness of the reproducing layer is in a range of not less than 10 nm and not more than 80 nm.

According to the described arrangement, the in-plane magnetization masking in the reproducing layer is desirably emphasized, and a desirable reproducing signal is obtained as the film thickness of the reproducing layer is optimized.

The eighth magneto-optical recording medium of the present invention having the arrangement of the first magneto-optical recording medium of the present invention is characterized in that the in-plane magnetization layer, the reproducing layer, the intermediate layer, and the recording layer are formed in this order, and the film thickness of the in-plane magnetization layer is in a range of not less than 2 nm and not more than 10 nm.

According to this arrangement, the exchange coupling force exerted between the in-plane magnetization layer and the reproducing layer is set so as to have a desirable condition, and the in-plane magnetization masking in the reproducing layer is desirably emphasized.

The ninth magneto-optical recording medium of the present invention having the arrangement of the first magneto-optical recording medium of the present invention is characterized in that the in-plane magnetization layer, the reproducing layer, the intermediate layer, and the recording layer are formed in this order, and the film thickness of the in-plane magnetization layer is in a range of not less than 15 nm and not more than 60 nm.

According to the described arrangement, the in-plane magnetization masking in the reproducing layer is desirably emphasized, and a desirable reproducing signal is obtained by optimizing the film thickness of the reproducing layer.

The tenth magneto-optical recording medium of the present invention having the arrangement of the sixth through ninth magneto-optical recording media is characterized in that the intermediate layer has the film thickness in a range of not less than 1 nm and not more than 80 nm.

According to the above arrangement, a desirable magnetostatic coupling is achieved by optimizing the film thickness of the non-magnetic intermediate layer, thereby achieving desirable magnetic superresolution reproducing.

As mentioned above, by optimizing the reproducing layer, the in-plane magnetization layer, and the intermediate layer, the exchange coupling force exerted between the in-plane magnetization layer and the reproducing layer is set so as to have a desirable condition, and the in-plane magnetization masking in the reproducing layer is emphasized. Further, a desirable reproducing signal is obtained. Moreover, desirable magnetostatic coupling and desirable magnetic superresolution reproducing can be achieved.

The eleventh magneto-optical recording medium of the present invention having the arrangement of the first magneto-optical recording medium is characterized by including the reflective layer provided between the intermediate layer and the recording layer.

According to the above arrangement, since the total film thickness of the reproducing layer and the in-plane magnetization layer becomes thin, the light beam for use in reproducing having passed through the reproducing layer and the in-plane magnetization layer is reflected by the reflective layer. As a result, reproducing of information from the recording layer, which is not necessary for the magnetic superresolution reproducing, is completely cut off, thereby improving magnetic superresolution reproducing characteristics.

The twelfth magneto-optical recording medium of the present invention having the same arrangement as the above-mentioned eleventh magneto-optical recording medium of the present invention is characterized in that the film thickness of the reflective layer is in a range of not less than 2 nm and not more than 40 nm.

According to the above arrangement, the light beam for use in reproducing is reflected by the reflective layer as the film thickness of the reflective layer is optimized, thereby improving the magnetic superresolution reproducing characteristics, while maintaining the magnetostatic coupling force exerted between the reproducing layer and the in-plane magnetization layer.

The thirteenth magneto-optical recording medium of the present invention having the arrangement of the eleventh magneto-optical recording medium of the present invention is characterized in that the reflective layer is made of metals or metal alloys which are amorphous.

According to the above arrangement, desirable magnetic superresolution reproducing characteristics are achieved, and because the magnetic characteristic of the recording layer formed on the reflective layer is improved, erasing is achieved with weaker erasing magnetic field.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium, comprising:

a reproducing layer which has in-plane magnetization at room temperature and in which a transition occurs from the in-plane magnetization to perpendicular magnetization at a temperature of not less than a critical temperature;

an in-plane magnetization layer in which in-plane magnetization disappears at a temperature in a vicinity of the critical temperature of said reproducing layer so that the direction of magnetization of said reproducing layer is no longer regulated by said in-plane magnetization layer, the in-plane magnetization layer being separately provided from the reproducing layer;

an intermediate layer made of a non-magnetic film;

a recording layer for recording information magneto-optically, said recording layer being made of a perpendicular magnetization film; and wherein said reproducing layer, said in-plane magnetization layer, said intermediate layer, and said recording layer are provided in this order from a light incident side.

2. The magneto-optical recording medium as set forth in claim 1, wherein:

there is no exchange coupling between said in-plane magnetization layer and said reproducing layer at a temperature in a vicinity of said critical temperature of said reproducing layer to allow leakage magnetic flux to be copied from said recording layer to said reproducing layer.

3. The magneto-optical recording medium as set forth in claim 1, wherein:

said in-plane magnetization layer has a Curie temperature substantially equal to said critical temperature.

4. The magneto-optical recording medium as set forth in claim 1, wherein:

said in-plane magnetization layer and said reproducing layer are exchange-coupled with each other at a temperature below said critical temperature.

5. The magneto-optical recording medium as set forth in claim 1, wherein:

said intermediate layer cuts off (1) exchange coupling exerted between said reproducing layer and said recording layer, and (2) exchange coupling exerted between said in-plane magnetization layer and said recording layer.

6. The magneto-optical recording medium as set forth in claim 1, wherein:

said reproducing layer and said recording layer are magnetostatically coupled with each other at a temperature in a vicinity of said critical temperature.

7. The magneto-optical recording medium as set forth in claim 1, wherein:

said in-plane magnetization layer is made of an alloy selected from the group consisting of a GdFe alloy, a GdFeAl alloy, a GdFeTi alloy, a GdFeTa alloy, a GdFePt alloy, a GdFeAu alloy, a GdFeCu alloy, a GdFeAlTi alloy, and a GdFeAlTa alloy.

8. The magneto-optical recording medium as set forth in claim 1, wherein:

said in-plane magnetization layer has a film thickness in a range of not less than 2 nm and mot more than 40 nm.

9. The magneto-optical recording medium as set forth in claim 8, wherein:

said intermediate layer has a film thickness in a range of not less than 1 nm and not more than 80 nm.

10. The magneto-optical recording medium as set forth in claim 1, wherein:

said reproducing layer has a film thickness in a range of not less than 10 nm and mot more than 80 nm.

11. The magneto-optical recording medium as set forth in claim 9, wherein:

said intermediate layer has a film thickness in a range of not less than 1 nm and not more than 80 nm.

12. The magneto-optical recording medium as set forth in claim 1, further comprising:

a reflective layer formed between said intermediate layer and said recording layer.

13. The magneto-optical recording medium as set forth in claim 12, wherein:

said reflective layer has a film thickness in a range of not less than 2 nm and not more than 40 nm.

14. The magneto-optical recording medium as set forth in claim 12, wherein:

said reflective layer is made of a metal that is amorphous.

15. The magneto-optical recording medium as set forth in claim 14, wherein:

said reflective layer is made of Al.

16. The magneto-optical recording medium as set forth in claim 12, wherein:

said reflective layer is made of an alloy that is amorphous.

17. The magneto-optical recording medium as set forth in claim 16, wherein:

said reflective layer is made of an alloy of Al and a magnetic metal.

18. The magneto-optical recording medium as set forth in claim 17, wherein:

said reflective layer has a composition of $Al_{1-x}Fe_x$ $(0.02 \leq X \leq 0.50)$.

19. The magneto-optical recording medium as set forth in claim 17, wherein:

said reflective layer has a composition of $Al_{1-x}Ni_x$ $(0.02 \leq X \leq 0.50)$.

20. The magneto-optical recording medium as set forth in claim 16, wherein:

said reflective layer is made of an alloy of Al and a non-magnetic metal.

21. The magneto-optical recording medium as set forth in claim 20, wherein:

said reflective layer has a composition of $Al_{1-x}Ti_x$ $(0.02 \leq X \leq 0.98)$.

22. The magneto-optical recording medium as set forth in claim 12, wherein:

said reproducing layer and said in-plane magnetization layer have a total film thickness of not more than 40 nm.

* * * * *